Dec. 26, 1933.                D. V. EDWARDS                1,941,076
                  VOLTAGE REGULATOR FOR ELECTRIC GENERATORS
                    Filed Aug. 28, 1931           2 Sheets-Sheet 1
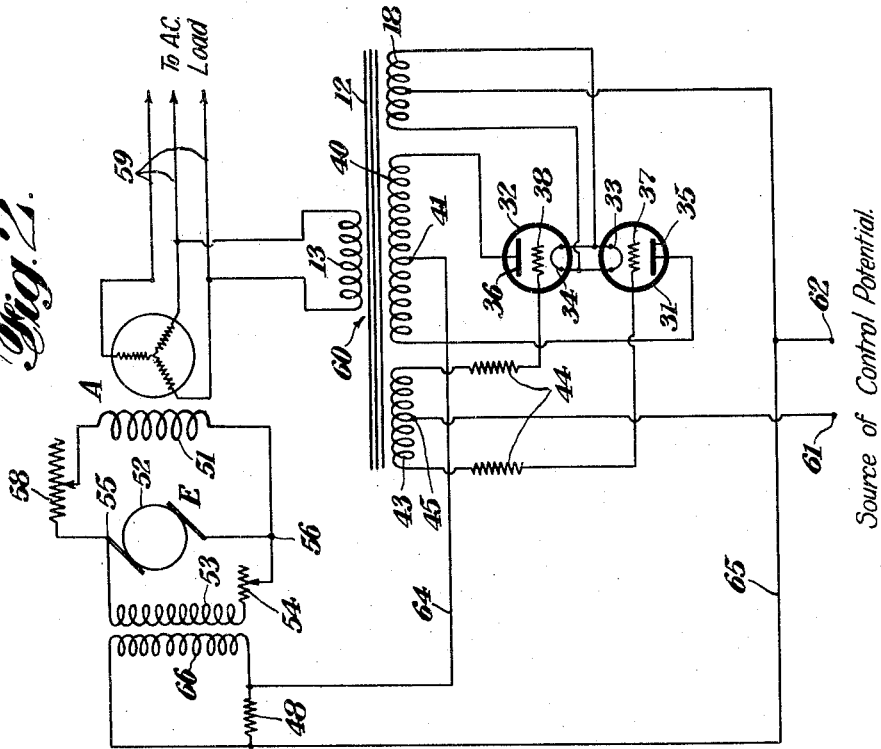
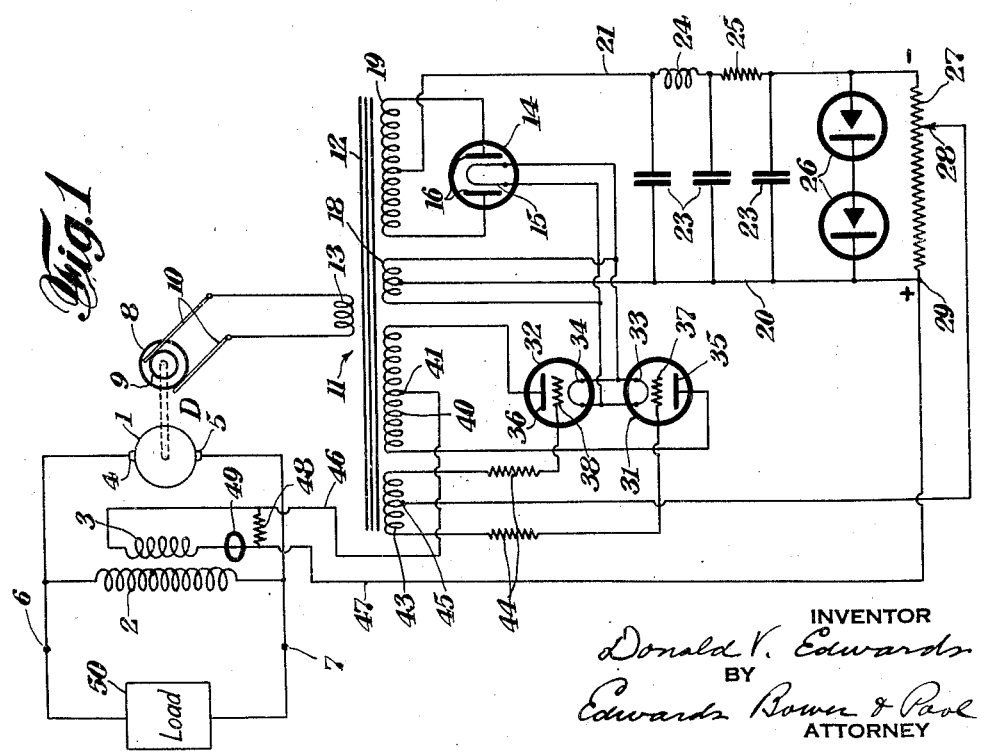
INVENTOR
Donald V. Edwards
BY
Edwards Bower & Pool
ATTORNEY Dec. 26, 1933. D. V. EDWARDS 1,941,076
VOLTAGE REGULATOR FOR ELECTRIC GENERATORS
Filed Aug. 28, 1931 2 Sheets-Sheet 2
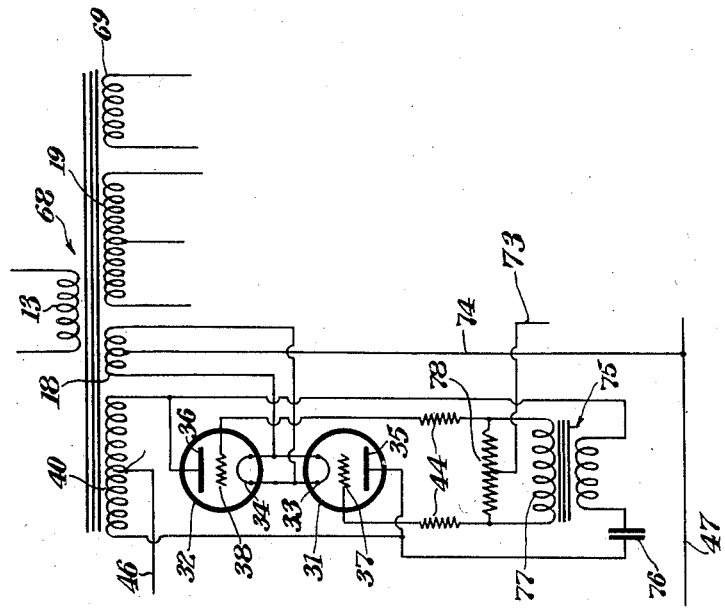
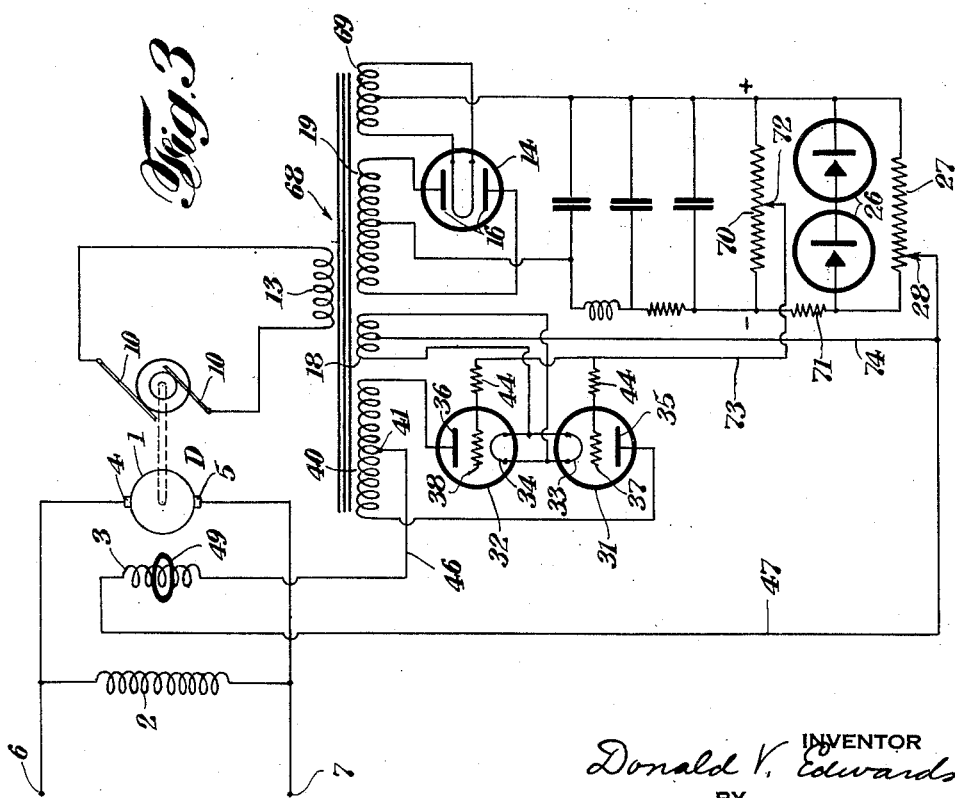
INVENTOR
Donald V. Edwards
BY
Edwards, Bower & Pool
ATTORNEY Patented Dec. 26, 1933

1,941,076

UNITED STATES PATENT OFFICE 1,941,076

VOLTAGE REGULATOR FOR ELECTRIC GENERATORS

Donald V. Edwards, East Orange, N. J., assignor to Electrons, Inc. of Delaware, a corporation of Delaware Application August 28, 1931. Serial No. 559,911

13 Claims. (Cl. 171—312)

This invention relates to voltage regulators for direct current or alternating current generators and more particularly to voltage regulators for electric generators which operate at variable speed or with variable load or both.

An object of this invention is to regulate the output voltage of an electric generator of any type having a magnetic field and an armature winding.

Another object of this invention is to maintain the output voltage of an electric generator constant, within narrow limits, throughout wide ranges of speed and load of the generator.

These objects are accomplished by establishing a voltage which is independent of the generator output voltage and another voltage which varies with the generator output voltage. The vector sum of these two voltages is arranged to control the output of unidirectional current from a suitable source of such current, which may be a gaseous rectifier system energized by alternating current from the generator. The unidirectional current thus controlled is used to vary the output voltage of the generator to be controlled, which may be done directly by varying the field strength of the generator or indirectly by varying the field strength of an exciter which provides the generator field current, or in any other suitable manner, thereby maintaining a desired relation between the generator output voltage and the independent voltage.

A further object of this invention is to reduce adjustment and maintenance problems in the use of voltage regulators, especially voltage regulators for car lighting systems.

This object is accomplished by obtaining an alternating current the potential of which varies with the generator output voltage, transforming it to a much higher voltage and impressing this high voltage on the control element or elements of a gaseous rectifier system which elements are negatively biased by a constant independent or control voltage. When the positive peak of the high alternating voltage reduces the negative bias to a critical value the rectifier supplies a corrective current impulse to the generator.

By thus controlling the rectifier system in accordance with the difference between two relatively high voltages the variations in critical voltage which usually occur during the life of a gaseous rectifier tube, or between different tubes, cause only negligible changes in the regulated output voltage of the generator. Rectifier tubes may, therefore, be replaced without requiring a re-adjustment of the regulator. The use of relatively high control voltages has the additional advantage that a small percentage change in generator output voltage causes a large change in the potential of the control elements, thereby making the regulator very sensitive. Glow tubes are preferred for maintaining the independent control voltage constant because they are fairly uniform and seldom change their output voltage throughout their life. In most cases they can be replaced without making any adjustments. A regulator according to this invention does not depend for its operation on batteries. Consequently the difficulties caused by changes in battery voltage and the expense of maintenance and inspection thereof are eliminated.

Other objects and advantages of the present invention will be apparent from the following description of several embodiments of the invention when taken in connection with the accompanying drawings, in which Fig. 1 shows diagrammatically a voltage regulator in accordance with this invention as applied to a direct current generator, Fig. 2 shows diagrammatically a voltage regulator in accordance with this invention as applied to an alternating current generator, Fig. 3 illustrates a modification of the regulator of Fig. 1, and Fig. 4 illustrates a modification of the circuit of Fig. 3.

In Fig. 1 reference character 1 represents the armature of a direct current generator D having a field winding 2 and means for varying the field strength produced by the field winding 2, such as another field winding 3. Armature 1 is provided with the usual commutator with associated brushes 4 and 5 for leading off direct current from the armature to output terminals 6 and 7. Field 2 is shown as a shunt field connected between terminals 6 and 7 but other known types of fields with appropriate connections may be used. Armature 1 is provided with a pair of slip rings 8 and 9 connected to points in the winding of armature 1 which will provide an alternating potential between slip rings 8 and 9. The peak value of this alternating potential should vary with the output voltage delivered at terminals 6 and 7. Suitable brushes 10 cooperate with slip rings 8 and 9 for leading off the alternating current. Other means for obtaining such alternating potential and current may, of course, be used.

The voltage regulator constituting one embodiment of this invention comprises a transformer, indicated generally at 11, having a core 12 with a primary winding 13 thereon and a plurality of secondary windings. Primary winding 13 is energized by the alternating current obtained from generator D and, as explained above, the voltage impressed on winding 13 varies with D. C. voltage of the generator.

A source of constant independent potential may be provided in the following manner: A rectifier tube 14, which may be an ordinary full wave rectifier having a filament 15 and plates 16, has its filament 15 energized from a suitable secondary winding 18 on transformer 11 and has its plate voltages provided by another winding 19 on the transformer in the usual manner. Output leads 20 and 21 for this rectifier are connected to the midpoints of windings 18 and 19 respectively. A suitable filter is provided for the rectifier consisting of a plurality of condensers 23 connected across the output leads, a choke 24 and current limiting resistance 25 connected in series with one of the leads, such as lead 21. The condensers 23 are connected respectively to the ends and common connection between choke 24 and resistance 25. Suitable means for maintaining the output potential of the rectifier constant such as voltage regulating tubes 26 are connected across the output side of the filter and a resistance 27 provides an output and load resistance for the rectifier. A suitable number of glow tubes such as 26 may be connected in series to provide a desired constant output voltage across the resistance 27. An adjustable tap 28 is arranged to make contact with any point on resistance 27. It will be understood by those skilled in the art that the rectifier and glow tube arrangement just described provides a constant potential between one end 29 of resistance 27 and tap 28 for any particular setting of the tap.

A source of unidirectional current for controlling the output voltage of generator D may be obtained as follows: A pair of gaseous rectifier tubes 31 and 32 having, respectively, cathodes 33 and 34, anodes 35 and 36, and control electrodes 37 and 38, are energized from suitable windings on transformer 11. Cathodes 33 and 34 may be energized from the winding 18 which supplies the heating current for rectifier tube 14. The anodes 35 and 36 are energized from a winding 40 on transformer 11, one anode being connected to each end of the winding. The output of rectifier tubes 31 and 32 may then be obtained by making connections to midpoint 41 of winding 40 and to the lead 20 connecting to winding 18.

When the control electrodes 37 and 38 of rectifier tubes 31 and 32 have a sufficiently negative potential with respect to their cathodes 33 and 34, respectively, current will not start to flow through the tubes even though their anodes are positive with respect to their cathodes. When, however, the negative potential bias on one of the control elements is reduced to a critical value, the tube is rendered immediately conductive. The control element is then ineffective for changing the conductivity of the tube but the flow of current through the tube may be stopped by reducing the anode potential to a low value or by making the anode potential negative with respect to the cathode after which the control element must again reach the critical potential to make the tube conductive. The above characteristics of gaseous rectifier tubes having control elements are well known.

In the voltage regulator shown in Fig. 1, use is made of these characteristics by providing a winding 43 on transformer 11 and connecting the opposite ends of this winding through current limiting impedances 44 to the control elements or grids 37 and 38 respectively. The connections should be such that when grid 37 is positive with respect to cathode 33, the anode 35 will be positive with respect to cathode 33; and similarly, during the other half of the cycle in primary winding 13, when grid 38 is positive with respect to cathode 34, the anode 36 will also be positive thereto. When the grids are negative the corresponding anodes will be negative and the tubes will be non-conductive. The output of this rectifier is further controlled by impressing a control potential, such as may be obtained from resistance 27 as above described, between the midpoint 45 on winding 43 and the cathodes 33 and 34 through output terminal 29 and lead 20. A constant control potential so connected provides a constant negative bias for grids 37 and 38, which bias may be made greater than the critical voltage of the grids. Then neither tube will be made conductive until the difference between the bias potential and the positively increasing potential obtained from winding 43 is equal to the critical voltage. It will be seen, therefore, that the rectifier tubes 31 and 32 will be made alternately conductive for a portion of each half cycle if the potential of winding 43 reduces the grid bias obtained from resistance 27 to the critical value.

As shown in Fig. 1 the output of the gaseous rectifier is connected by leads 46 and 47 to the field winding 3 so as to oppose the flux created by field winding 2. A resistance 48 may be connected across field winding 3 to provide a discharge path for the energy stored therein, when the current from the rectifier is interrupted. It is preferable, however, to provide a heavy short-circuited turn 49 in close inductive relation to field winding 3. This turn may take the form of a spool of copper or other conductive material on which winding 3 is wound. If winding 3 is divided into several portions, i. e. one portion for each pole of field winding 2, then each portion may be wound on a separate spool.

The operation of the voltage regulator shown in Fig. 1 is as follows. Assuming that the generator D starts from rest, the voltage at terminals 6 and 7 builds up in the usual manner as the speed increases until normal operating voltage is obtained. During this period the alternating potential impressed upon grids 37 and 38 by the winding 43 is not sufficient to reduce the grid bias to the critical value and no current will be delivered by rectifier tubes 31 and 32. A slight further increase in speed causes the peak voltage of winding 43 to exceed the difference between the control voltage, derived from terminals 28 and 29, and the critical voltage. One of the tubes 31 or 32 will then become conductive and send an impulse of current through field winding 3 which current tends to reduce the output voltage of the generator. If a single impulse is insufficient to reduce the output voltage to the normal value, during the next half cycle the other tube will "spill over" and send another impulse of current through winding 3. The duration of each impulse of current is approximately one-quarter cycle because, as previously explained, each tube when started continues to pass current until its plate voltage is reduced to zero or nearly so. For moderate speeds of generator D a single impulse, or short series of impulses, at intervals, is sufficient to keep the output voltage of the generator at normal value but as the generator speed increases the impulses become more frequent until a speed is reached at which the maximum corrective effect of the gaseous rectifier is obtained. The effective reactance of field winding 3 is reduced by the short-circuited conductor or spool 49 thereby permitting a series of impulses to set up a larger current in winding 3. When current is increasing in this winding, conductor 49 absorbs energy from it and the flux produced by the induced current in conductor 49 opposes the flux of winding 3; but when the current in winding 3 is decreasing or is interrupted the current induced in spool 49 produces flux in the same direction as winding 3. The effects of the individual impulses are merged and a substantially continuous corrective effect is applied to field winding 2. This corrective effect increases or decreases according to the number of current impulses received by winding 3, which results in a smooth and effective regulation within close limits.

Changes in output voltage which would ordinarily result from changes in load on generator D are immediately corrected in the same manner.

The normal operating voltage of generator D may be changed by changing the position of tap 28 on resistance 27. The greater the control voltage applied to the grids 37 and 38 from this resistance, the higher will be the operating voltage of the generator.

The above described voltage regulator is particularly suitable for use in connection with car lighting generators which are usually suspended beneath a railroad car and driven by a belt from an axle of the car. The generator speed varies with the car speed but it is highly desirable to prevent a corresponding variation in the light emitted by lamps within the car or the rate of charge of the storage battery usually provided in such cases. By the use of the regulator above described the output voltage of the generator may be maintained at a constant value regardless of the speed at which the generator operates, within the operating limits thereof.

At low speeds of generator D the starting and stopping of current through winding 3 would tend to make the car lamps flicker. Such flicker is prevented, however, by the provision of resistance 48 across the winding 3, or the short-circuited turn 49 in the vicinity thereof. Either of these devices smooths out the effect of individual impulses.

In Fig. 2 a modification of the voltage regulator of Fig. 1 is shown diagrammatically in connection with an alternating current generator A which may be of any type. For purposes of illustration, generator A is shown as a three phase alternator having its field winding 51 energized by an exciter E which may be a direct current generator having an armature 52, field winding 53, field resistance 54 and output terminals 55 and 56. An adjustable resistance 58 may be connected in series between the exciter and the field 51 in the usual manner. Leads 59 serve to connect the armature winding of generator A to its load. The parts of the voltage regulator shown in Fig. 2 which are similar to and have the same function as the corresponding parts of the regulator shown in Fig. 1 are indicated by the same reference characters. The transformer 60 of Fig. 2, however, is not provided with windings and associated apparatus for establishing the control potential. The control potential may be obtained from a suitable source of constant potential, or from a source of potential which varies in the manner in which it is desired that the output voltage of generator A should vary. Such control potential may be connected to terminals 61 and 62 on the regulator, which terminals are connected respectively to midpoint 45 on transformer winding 43 and a point on cathode winding 18. Conducting leads 64 and 65 are connected respectively to midpoint 41 on the plate winding 40 and to the same point on cathode winding 18 to which terminal 62 is connected. A field control winding 66, similar to winding 3 of Fig. 1, is provided on exciter E and connected so as to oppose the magnetic flux generated by field winding 53. Winding 66 is connected to the rectifier by the leads 64 and 65. The primary winding 13 of transformer 60 is preferably connected across one phase of the generator output leads 59.

It will be apparent to those skilled in the art that any change in the field strength of exciter E will change its output voltage and thereby change the field strength of generator A, which results in a corresponding change in the alternating output voltage of generator A. Resisters 54 and 58 may be manually adjusted to limit the currents in their respective circuits as desired.

The operation of the regulator shown in Fig. 2 is similar to the operation of the regulator of Fig. 1. The alternating potential of generator A is impressed on primary winding 13 and if this potential becomes greater than normal, as determined by the control potential applied to terminals 61 and 62, the voltage induced in winding 43 causes impulses of current to be delivered by rectifier tubes 31 and 32 in the manner previously described. These impulses of current pass through field winding 66 thereby reducing the voltage generated by exciter E. This reduction in voltage of the exciter causes a reduction in the output voltage of alternator A. Therefore any tendency of the generator A to increase its output voltage is immediately counteracted by the corrective effect of the voltage regulator acting on the exciter field.

Only a single generator and a single exciter are illustrated. It will be apparent, however, to those skilled in the art, that the regulator shown in Fig. 2 may be connected to alternating current busses which receive the output of a number of generators operating in synchronism and the corrective effect may be applied to the fields of a plurality of exciters operating either in parallel or separately.

It should be noted that, in the voltage regulators described above and illustrated in Figs. 1 and 2, full corrective current is supplied by the rectifier for the duration of each impulse and the total corrective effect is governed by the number of impulses. This method of correction does not cause "hunting" which is sometimes very troublesome in regulating systems wherein the corrective effect is proportional to the correction to be made.

In the circuits shown in Figures 3 and 4 those parts which are similar to and have the same function as the corresponding parts of the circuit shown in Figure 1 are indicated by the same reference characters.

The voltage regulator illustrated in Fig. 3 is similar to the regulator of Fig. 1 except that in Fig. 3, the field winding 3 is arranged to increase or boost the magnetic field provided by field winding 2, and the regulator is arranged to send impulses of current through field winding 3 when the voltage of generator 1 is below normal, a sufficient number of impulses being delivered by the rectifier tubes 31 and 32 to maintain normal output voltage at the terminals 6 and 7.

The alternating potential obtained from the generator D is impressed across primary winding 13 of a transformer indicated generally by reference character 68. Secondary windings 19 and 69 on this transformer energize, respectively, the plates and cathode of rectifier tube 14, the output of which is filtered in the usual manner. A resistance 70 is connected across the output of this rectifier. In parallel with resistance 70, a plurality of voltage regulator or glow tubes 26 and a resistance 71 are connected in series. A resistance 27 having a variable tap 28 is connected across the glow tubes 26 as in Fig. 1. A variable tap 72 is provided on resistance 70 and is connected to the grids 37 and 38 through lead 73 and resistances 44. Tap 28 is connected to filament winding 18 and the cathodes of tubes 31 and 32 through lead 74.

The grid bias impressed on rectifier tubes 31 and 32 is the resultant of the constant positive bias obtained from that portion of resistance 27 between tap 28 and the positive end of the resistance, and the variable negative bias obtained from that portion of resistance 70 between tap 72 and the positive end of resistance 70. The negative bias varies according to the output voltage of generator D and therefore the net bias on grids 37 and 38 varies by the same amount, in volts, but by a much greater percentage. When the output voltage of generator D is below normal the variable bias is less than normal and therefore the net grid bias is less negative than the critical value, thereby causing tubes 31 and 32 to alternately become conductive and supply current to field winding 3. This current increases the field flux and thereby raises the output voltage of generator D. Any tendency of the output voltage to rise above the normal value is corrected because the variable grid bias then becomes greater than normal and causes the grids 37 and 38 to be more negative than the critical value, thereby preventing the starting of current through rectifier tubes 31 and 32. A short-circuited turn 49, as previously described, is provided adjacent field winding 3 to smooth out the impulses of current received from the rectifier.

Fig. 4 shows a modification of the circuit of Fig. 3 and only such parts of the circuit of Fig. 3 are shown as are necessary to describe this modification. In Fig. 4 the plate winding 40 in addition to energizing the plates of rectifier tubes 31 and 32 energizes the primary winding of a transformer 75, through a condenser 76. The secondary winding 77 of this transformer is connected between the grids 37 and 38 and supplies a small alternating potential to the grids which is out of phase with the plate potential of tubes 31 and 32. The usual grid impedances 44 are provided in series with grids 37 and 38. A resistance 78 is connected across secondary winding 77 and is connected at its center to lead 73.

In the modification shown in Fig. 4 the net bias potential impressed on grids 37 and 38 through leads 73 and 74 is modified by the out-of-phase alternating potential obtained from secondary winding 77. The connections of this winding to the grids should be such that during the greater portion of the positive half cycle of either plate the increment added to the net bias of the corresponding grid by winding 77 will increase in the positive direction. When this is done the value of negative bias obtained from resistance 70 at which the tubes become conductive, is less during the earlier part of the positive half cycle of the plate than during the latter part thereof. That is, as the output voltage of the generator drops and thereby causes the variable grid bias to drop, the tubes 31 and 32 are made conductive for a larger portion of each half cycle.

It will be seen, therefore, that in the arrangement shown in Fig. 4, the corrective effect depends not only on the number of impulses but upon their duration, both of which vary in accordance with the corrective effect needed to maintain the output voltage of generator D constant.

The embodiments of the invention illustrated and described herein have been selected for the purpose of clearly setting forth the principles involved. It will be apparent, however, that the invention is susceptible of being modified to meet different conditions encountered in its use and it is, therefore, intended that the appended claims cover all modifications within the true spirit and scope of the invention.

What I claim is:—

1. A voltage regulating system for an electric generator, comprising means for obtaining a potential from said generator which varies with the generator output voltage, means for obtaining a constant potential from said generator which is independent of the output voltage, a source of unidirectional current, means for controlling the unidirectional current obtained from its source according to the vector sum of said varying potential and said independent potential and means for controlling the generator output voltage in accordance with said unidirectional current.

2. A voltage regulating system for an electric generator having a magnetic field, comprising means for obtaining an alternating potential from said generator, the peak potential of which varies in accordance with the generator output voltage, means for obtaining a constant potential from said generator which is independent of the output voltage, a gaseous rectifier energized by alternating current from said generator, means for controlling the number of impulses delivered by said gaseous rectifier in accordance with the vector sum of said peak and independent potentials and means for varying the field strength of the generator by said impulses.

3. A voltage regulator comprising a transformer having a primary winding adapted to be energized by alternating current from a generator, the said current varying in accordance with the generator output voltage, a rectifier energized from secondary windings on said transformer, a filter for the output of said rectifier, means for maintaining the rectifier output voltage substantially constant, a gaseous rectifier energized from an additional secondary winding on said transformer, said gaseous rectifier having a control element, a secondary winding on said transformer adapted to impress an alternating potential upon said control element in accordance with the primary potential of said transformer, means for biasing said control element by a portion of the constant voltage derived from the first-mentioned rectifier and means for connecting the output of said gaseous rectifier to a field winding on said generator.

4. A voltage regulating system for an electric generator, comprising means for obtaining an alternating current from said generator, the peak potential of which varies in accordance with the generator output voltage, a plurality of gaseous rectifier tubes energized from said alternating current, said tubes having control elements, means actuated by said alternating current for applying a constant negative bias to said control elements which is independent of the output voltage, means responsive to said peak potential for reducing said negative bias whereby an impulse of current is delivered by each rectifier tube in each cycle that is grid potential is reduced to a critical value, and means for controlling the generator output voltage by said impulses.

5. A voltage regulating system for a low voltage direct current generator, comprising means for obtaining a low voltage alternating current from said generator, the peak voltage of which varies with the direct current output voltage of the generator, means for transforming said low alternating voltage to a relatively high alternating voltage, a rectifying system actuated by said low voltage alternating current and arranged to provide a constant potential of the same order of magnitude as the peak potential of said high alternating voltage, and means for controlling the said direct current output voltage according to the difference between said peak potential and said constant potential.

6. A voltage regulator for an electric generator having a magnetic field in excess of that required to generate normal output voltage, comprising a gaseous rectifier system adapted to supply impulses of current to said field in a direction to reduce the output voltage of said generator, and means responsive to the output voltage for controlling the number of impulses supplied by the said rectifier.

7. A voltage regulator for an electric generator having a magnetic field, comprising a gaseous rectifier system adapted to supply impulses of current, means for varying the magnetic field of said generator in response to said current impulses and means responsive to the output voltage of said generator for controlling the number of impulses supplied by said rectifier.

8. A voltage regulating system for an electric generator having a magnetic field, comprising a gaseous rectifier system adapted to supply impulses of current, an auxiliary field winding on said generator connected to said rectifier system and adapted to be energized thereby, means responsive to the output voltage of said generator for controlling the number of impulses supplied by said rectifier and means for absorbing energy from said auxiliary winding when the current is increasing therein and continuing the effect of said auxiliary field when the current in said auxiliary winding is decreasing or is interrupted.

9. A voltage regulating system for an electric generator, comprising means for supplying magnetic field flux to said generator in excess of the flux required to generate normal output voltage, an auxiliary source of field flux, a gaseous rectifier capable of supplying current impulses for energizing said auxiliary source, means responsive to the output voltage of said generator for controlling the number of impulses supplied by said rectifier and electrical connections between said auxiliary source and said rectifier whereby said current impulses energize the auxiliary source in a direction to reduce the output voltage of said generator.

10. A voltage regulating system, comprising the combination defined by claim 9 and means for reducing the effective reactance of said auxiliary source of field flux.

11. In a voltage regulating system for an electric generator having a magnetic field, the combination of means for varying the magnetic flux in the generator field, said means comprising a winding, a rectifier system connected to said winding and adapted to supply current impulses thereto, and a short-circuited conductor in close inductive relation to said winding.

12. A voltage regulating system for a direct current generator having armature and field windings, which comprises connections to said armature winding for obtaining alternating current therefrom the peak potential of which varies in accordance with the direct current output voltage, means comprising a rectifier system for obtaining a constant potential from the generator which is independent of the said output voltage, a gaseous rectifier system energized by the said alternating current and including means for rendering the system conductive only during those cycles wherein the difference between the said constant and peak potentials is less than a predetermined value, and electrical connections from said gaseous rectifier system to one of said field windings.

13. In a regulating system for a dynamo-electric machine having a magnetic field, means including a winding for varying the magnetic flux in said field, a rectifier system connected to said winding and adapted to supply current impulses thereto, and means for reducing the effective reactance of said winding.

DONALD V. EDWARDS.